United States Patent
Arakawa et al.

(10) Patent No.: US 10,443,111 B2
(45) Date of Patent: Oct. 15, 2019

(54) METHOD FOR REMOVING IRON FROM IRON-CONTAINING SOLUTION AND METHOD FOR RECOVERING VALUABLE METALS

(71) Applicant: JX NIPPON MINING & METALS CORPORATION, Tokyo (JP)

(72) Inventors: Junichi Arakawa, Tsuruga (JP); Junichi Ito, Tsuruga (JP); Takuya Yokota, Hitachi (JP)

(73) Assignee: JX NIPPON MINING & METALS CORPORATION, Tokyo (JP)

( * ) Notice: Subject to any disclaimer, the term of this patent is extended or adjusted under 35 U.S.C. 154(b) by 53 days.

(21) Appl. No.: 15/563,478

(22) PCT Filed: Mar. 29, 2016

(86) PCT No.: PCT/JP2016/060233
§ 371 (c)(1),
(2) Date: Sep. 29, 2017

(87) PCT Pub. No.: WO2016/159001
PCT Pub. Date: Oct. 6, 2016

(65) Prior Publication Data
US 2018/0073098 A1    Mar. 15, 2018

(30) Foreign Application Priority Data
Mar. 31, 2015 (JP) .................... 2015-072586

(51) Int. Cl.
*C22B 3/08* (2006.01)
*C01G 45/02* (2006.01)
(Continued)

(52) U.S. Cl.
CPC .............. *C22B 3/08* (2013.01); *C01G 45/02* (2013.01); *C01G 49/02* (2013.01); *C22B 3/44* (2013.01);
(Continued)

(58) Field of Classification Search
CPC .. C22B 3/44; C22B 3/46; C22B 7/007; C01G 45/02; C01G 49/02–49/49; H01M 10/54; Y02W 30/84; Y02P 10/234
See application file for complete search history.

(56) References Cited

U.S. PATENT DOCUMENTS 6,120,927 A * 9/2000 Hayashi ............... H01M 10/54
423/179.5
2004/0237720 A1 12/2004 Moyes et al.
2015/0267278 A1 9/2015 Wohlgemuth et al.

FOREIGN PATENT DOCUMENTS

EP    2450991 A1    5/2012
JP    2005-501973 A    1/2005
(Continued)

OTHER PUBLICATIONS

WO 2015071848 A machine translation (Year: 2015).*
(Continued)

*Primary Examiner* — Tima M. McGuthry-Banks
(74) *Attorney, Agent, or Firm* — Birch, Stewart, Kolasch & Birch, LLP

(57) ABSTRACT

The present invention provides a method for removing iron from an iron-containing solution containing an iron ion, comprising adding a lithium ion battery cathode material containing manganese to an acidic sulfuric acid solution to obtain a cathode material-containing solution, and then precipitating a manganese ion as manganese dioxide in a mixed solution obtained by mixing the iron-containing solution with the cathode material-containing solution while (Continued)

precipitating the iron ion contained in the iron-containing solution as a solid.

10 Claims, 1 Drawing Sheet

(51) Int. Cl.
  *H01M 10/54* (2006.01)
  *C01G 49/02* (2006.01)
  *C22B 3/44* (2006.01)
  *C22B 7/00* (2006.01)
  *C22B 23/00* (2006.01)
  *C22B 47/00* (2006.01)
(52) U.S. Cl.
  CPC ............... *C22B 7/00* (2013.01); *C22B 7/007* (2013.01); *C22B 23/00* (2013.01); *C22B 47/00* (2013.01); *H01M 10/54* (2013.01); *Y02P 10/234* (2015.11); *Y02W 30/84* (2015.05)

(56) References Cited

FOREIGN PATENT DOCUMENTS

| JP | 2014-005496 A | 1/2014 | | |
|---|---|---|---|---|
| JP | 2014-156648 A | 8/2014 | | |
| JP | 2014-156649 A | 8/2014 | | |
| WO | WO 2014/056610 A1 | 4/2014 | | |
| WO | WO 2015071848 A | * | 5/2015 | ......... C22B 23/0415 |

OTHER PUBLICATIONS

Cai, Guoqiang et al. "Process Development for the Recycle of Spent Lithium Ion Batteries by Chemical Precipitation." Industrial & Engineering Chemistry Research. vol. 53, pp. 18245-18259. dx.doi.org/10.1021/ie5025326 (Year: 2014).*
English Translation of International Preliminary Report on Patentability and Written Opinion of the International Searching Authority (Forms PCT/IB/338, PCT/IB/373 and PCT/ISA/237) dated Oct. 12, 2017, for International Application No. PCT/JP2016/060233.
International Search Report issued in PCT/JP2016/060233 (PCT/ISA/210), dated May 17, 2016.
Written Opinion of the International Searching Authority issued in PCT/JP2016/060233 (PCT/ISA/237), dated May 17, 2016.
Castillo et al, "Advances in the recovering of spent lithium battery compounds", Journal of Power Sources, vol. 112, 2002, pp. 247-254.
Chen et al, "Hydrometallurgical recovery of metal values from sulfuric acid leaching liquor of spent lithium-ion batteries," Waste Management, vol. 38, 2015 (Available online Jan. 22, 2015), pp. 349-356.
Extended European Search Report, dated Sep. 19, 2018, for corresponding European Application No. 16772882.3.

* cited by examiner

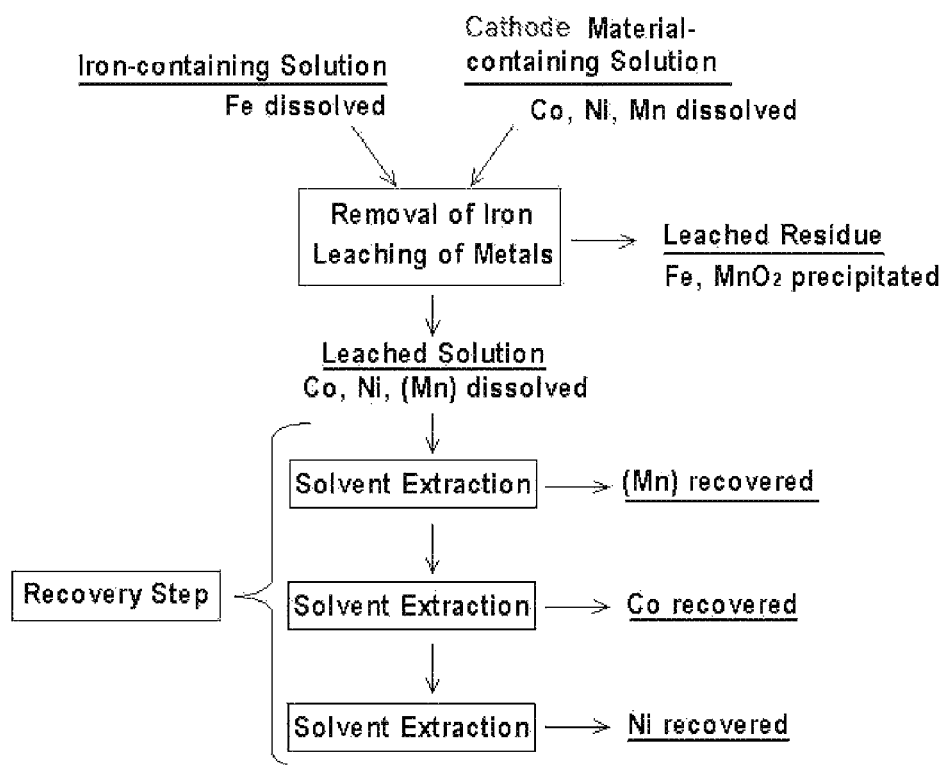

METHOD FOR REMOVING IRON FROM IRON-CONTAINING SOLUTION AND METHOD FOR RECOVERING VALUABLE METALS

TECHNICAL FIELD

The present invention relates to a method for removing iron from an iron-containing solution containing an iron ion and a method for recovering valuable metals. More particularly, the present invention proposes a technique that allows effective and easy removal of iron from the iron-containing solution to contribute to improvement of processing efficiency and reduction of costs.

BACKGROUND ART

In a process of individually separating and recovering various metals that can be contained in various batteries and semiconductors, electric and electronic parts or other metallic materials, for example in order to recycle metals used or discarded in applications such as the above various batteries and the like, metal-containing solutions such as iron-containing solutions containing iron ions can be obtained by treatments of pulverizing the used metals and dissolving them in acids or like or many other treatments.

For recovery of each metal ion as a solid from the metal-containing solution that may contain various kinds of metals as metal ions, it is necessary to sequentially subject the metal-containing solution to a plurality of stages of solvent extraction or neutralization depending on the metals to be separated and further subject each solution obtained in each stage to reverse extraction, electrolysis, carbonization or other treatments, in order to separate each metal leached in the metal-containing solution.

As an example of such a method for recovering the metals, for example, when recovering the valuable metals or the like from lithium ion battery scraps, the lithium ion battery scraps in the form of powder or particle obtained through each step such as roasting, crushing and sieving as required are firstly leached with an acid and lithium, nickel, cobalt, manganese, iron, copper, aluminum or the like that can be contained therein are dissolved in an acidic solution to obtain a leached solution.

The leached solution is then subjected to a solvent extraction method to sequentially separate respective metal elements. Here, each valuable metal can be recovered by firstly recovering iron and aluminum, subsequently recovering manganese and copper, then cobalt, and then nickel, and finally leaving lithium in the aqueous phase.

SUMMARY OF THE INVENTION

Technical Problem

As described above, many treatments are required for separating and recovering each metal from the metal-containing solution containing plural kinds of metal ions. Therefore, if a specific metal ion can be beforehand removed from plural kinds of metal ions contained in the metal-containing solution as a solid, any required treatment for recovering the removed metal, among various treatments for subjecting the metal-containing treatments to separate and recover each metal, can be simplified or omitted in a subsequent recovery step, which will be effective from the viewpoint of processing efficiency and costs.

An object of the present invention is to solve such problems, and to provide a method for removing iron from an iron-containing solution, which can effectively and easily remove iron from the iron-containing solution containing the iron ion to contribute to improvement of processing efficiency and reduction of costs, and a method for recovering valuable metals.

Solution to Problem

The present inventors have found that when adding a cathode material for a lithium ion battery to an acidic sulfuric acid solution and leaching the cathode material, manganese contained therein is firstly dissolved to form a manganese ion, and the manganese ion is then separated and precipitated as manganese dioxide. Further, the present inventors have found that the precipitation reaction of manganese dioxide can be promoted and the iron ion is formed into a solid and incorporated into the residue, by mixing the iron-containing solution containing the iron ion with a cathode material-containing solution obtained by adding the cathode material for the lithium ion battery to the acidic sulfuric acid solution.

Then, the present inventors have considered that by using the findings, iron can be effectively and easily removed from the iron-containing solution.

Based on such findings, the present invention provides a method for removing iron from an iron-containing solution containing an iron ion, comprising adding a lithium ion battery cathode material containing manganese to an acidic sulfuric acid solution to obtain a cathode material-containing solution, and then precipitating a manganese ion as manganese dioxide in a mixed solution obtained by mixing the iron-containing solution with the cathode material-containing solution while precipitating the iron ion contained in the iron-containing solution as a solid.

The method may be particularly effective when an iron ion concentration in the iron-containing solution is from 50 mg/L to 1 g/L.

Here, in the method for removing iron from the iron-containing solution of the present invention, a pH of the mixed solution obtained by mixing the iron-containing solution with the cathode material-containing solution may be preferably from 1 to 2.

Further, an ORP value of the mixed solution obtained by mixing the iron-containing solution with the cathode material-containing solution may be preferably 900 mV or more.

Furthermore, in the method for removing iron from the iron-containing solution of the present invention, hydrogen peroxide water may be preferably added when the cathode material containing manganese is leached.

In the method for removing iron from the iron-containing solution of the present invention, manganese dioxide may be preferably added to the mixed solution obtained by mixing the iron-containing solution with the cathode material-containing solution. In this case, it is more preferable that manganese dioxide added to the mixed solution may be manganese dioxide contained in a leached residue of a lithium ion battery cathode material containing manganese.

Further, in the method for removing iron from the iron-containing solution of the present invention, the lithium ion battery cathode material may further comprise, in addition to manganese, at least one cathode material-forming metal making up the lithium ion battery cathode material, and the iron-containing solution may further comprise the cathode material-forming metal in advance.

Specifically, the at least one cathode material-forming metal may be cobalt and/or nickel.

The present invention further provide a method for recovering at least one valuable metal as the at least one cathode material-forming metal contained in the lithium ion battery cathode material and the iron-containing solution by using the method for removing iron from the iron-containing solution as described above, comprising carrying out the method for removing iron from the iron-containing solution, and then recovering the at least one valuable metal contained in the iron-containing solution as well as the at least one valuable metal contained in the lithium ion battery cathode material.

Advantageous Effects of Invention

According to the method for removing iron from the iron-containing solution of the present invention, the manganese ion can be precipitated as manganese dioxide by mixing the iron-containing solution with the cathode material-containing solution, and with the precipitation reaction, the iron ion can also be precipitated as a solid, so that iron can be effectively and easily removed from the iron-containing solution.

As a result, it is possible to simplify or omit a process for removing iron from the iron-containing solution, for example in a subsequent step and the like, which can contribute to improvement of processing efficiency and reduction of costs.

BRIEF DESCRIPTION OF THE DRAWINGS

FIG. 1 is a flow chart showing one embodiment of a valuable metal recovery method of the present invention.

DESCRIPTION OF THE PREFERRED EMBODIMENTS

Embodiments of the present invention will be described in detail below.

The method for removing iron from the iron-containing solution according to one embodiment of the present invention comprises a solution mixing step of mixing an iron-containing solution containing an iron ion with a cathode material-containing solution obtained by adding a lithium ion battery cathode material containing manganese to an acidic sulfuric acid solution.

According to the solution mixing step, manganese contained in the lithium ion battery cathode material is leached out with sulfuric acid and a manganese ion is then produced, and the manganese ion is reduced as manganese dioxide based on oxidation-reduction reaction resulting from contact with other metals, as well as the iron ion contained in the iron-containing solution is precipitated as a solid, so that the iron ion can be effectively removed.

Non-limited specific examples will be described below.
(Iron-Containing Solution)

The iron-containing solution may contain iron as a metal ion. Examples of the iron-containing solution includes solutions obtained by acid-leaching various batteries, semiconductors, electric and electronic parts, which contain iron, including liquid crystal displays, tool coating, glass coding, optical disks, hard disks, solar batteries, cathode materials for lithium ion batteries, and sputtering target materials used for the positive electrode and other metal materials.

The iron-containing solution may contain the iron ion at a concentration of 50 mg/L to 1 g/L, and more preferably at a concentration of 50 mg/L to 400 mg/L. If the iron ion concentration in the iron-containing solution is too high, iron cannot be sufficiently removed, so that effects of improvement of the processing efficiency and reduction of costs in the subsequent step may not be achieved as expected.

Further, before being mixed with the cathode material-containing solution obtained by adding the lithium ion battery cathode material to the acidic sulfuric acid acidic solution, the iron-containing solution may preferably contain at least one cathode material-forming metal in any form as described below, which makes up the positive electrode positive electrode. Thus, when the metal contained in the cathode material-containing solution is separated and recovered after being mixed with the cathode material-containing solution, the cathode material-forming metal can also be recovered together, thereby improving the processing efficiency.

It is preferable that the cathode material-forming metal is dissolved in the iron-containing solution and contained as an ion when the iron-containing solution contains the cathode material-forming metal. However, when contained as a solid, the cathode material-forming metal may be contained in the form of an oxide, for example.
(Cathode Material-Containing Solution)

The cathode material-containing solution to be mixed with the above iron-containing solution can be obtained by adding the lithium ion battery cathode material to the acidic sulfuric acid solution.

The lithium ion battery cathode material may be either a brand new one immediately after being manufactured, or one after being used for a certain period of time, or one discarded due to the life time of the battery product, a manufacturing defect or other reasons. However, it is advantageous to use cathode material scraps after being used or disposed, in terms of reduction of raw material costs and recycling by reuse of resources.

The lithium ion battery cathode material may include cathode materials with aluminum foils or positive electrode active materials, or at least one of them, or those which are obtained, for example, by optionally roasting, chemical-treating, crushing and/or sieving them, and the like. Depending on the type of the lithium ion battery cathode material, such roasting, chemical-treating, crushing and sieving may not be necessarily required.

Such a lithium ion battery cathode material may contain at least one element of lithium, nickel, cobalt and manganese making up the positive electrode active material, as well as optionally aluminum making up the aluminum foil, i.e., the cathode material-forming metal, for example in the form of an oxide. It is understood that among them, the lithium ion battery cathode material used to produce the cathode material-containing solution contains at least manganese among the cathode material-forming metals. Thus, precipitation of iron by manganese can be achieved when the iron-containing solution is mixed with the cathode material-containing solution.

Nickel and cobalt are relatively expensive valuable metals among the cathode material-forming metals. Therefore, it is desirable to recover at least these metals. As will be described below, after mixing the iron-containing solution with the cathode material-containing solution to precipitate iron, the lithium ion battery cathode material used for forming the cathode material-containing solution may preferably contain nickel and/or cobalt in order to recover the above valuable metals.

On the other hand, if lithium of the cathode material-forming metals is contained in the cathode material-containing solution, lithium may raise the pH and inhibit adjustment to a predetermined low pH during precipitation of iron in a mixed solution as described below. Therefore, it is preferable that the cathode material-containing solution does not contain lithium. The cathode material-containing solution that does not contain lithium can be obtained, for example by washing the lithium ion battery cathode material with water or the like to remove lithium, and then adding the lithium ion battery positive material to the acidic sulfuric acid solution.

Before being mixing with the iron-containing solution, the cathode material-containing solution may be in the state where a part or all of the metals contained in the above-described lithium ion battery cathode material has been leached, but such metals may also be in the state where they are still not be leached. From the viewpoint of shortening the reaction time, the metals in the cathode material-containing solution before being mixed with the iron-containing solution may be in a non-leached state, and the metals may be preferably leached such as by adding sulfuric acid, after being mixing with the iron-containing solution. Among the metals contained in the cathode material-containing solution, manganese may be preliminarily leached before mixing to form a manganese ion.

(Solution Mixing Step)

In the solution mixing step, a mixed solution is obtained by mixing the iron-containing solution with the cathode material mixed solution as described above.

After leaching manganese in the lithium battery cathode material contained in the cathode material-containing solution to generate the manganese ion, the leaching of valuable metals is facilitated by oxidation-reduction reaction, for example resulting from contact of the manganese ion with the valuable metals, while the manganese ion is educed and precipitated as manganese dioxide.

In this case, by mixing the iron-containing solution with the cathode material mixed solution, manganese is precipitated as manganese dioxide in the mixed solution, and accordingly, the iron ion in the mixed solution is also precipitated as a solid.

Here, since the mixed solution becomes an oxidizing atmosphere by the cathode material that is an oxide, $Fe^{2+}$ in the mixed solution is oxidized to $Fe^{3+}$. The $Fe^{3+}$ tends to easily precipitate as compared with the $Fe^{2+}$ as an oxide (hydroxide) even at a lower pH. As a result, it is believed that iron is precipitated together with manganese dioxide. In most cases, although the iron ion is precipitated as a solid such as iron hydroxide Fe $(OH)_3$, precipitation may occur in other forms.

It should be noted that the manganese ion in the mixed solution is not limited to that produced by leaching manganese contained in the lithium ion battery cathode material, and the manganese ion may be present or produced in the mixed solution by separately adding a solution containing the manganese ion or a material containing manganese or the like to the mixed solution.

When iron is precipitated as described above, the pH of the mixed solution may be preferably 1 to 2. If the pH of the mixed solution is more than 2, nickel and cobalt that may be contained in the mixed solution are also precipitated, and the recovery rate would be thus decreased when these valuable metals are subsequently recovered. On the other hand, if the pH of the mixed solution is less than 1, it is concerned that Fe does not precipitate and remain dissolved. From such viewpoint, the pH of the mixed solution may be more preferably from 1.5 to 2.0.

The ORP value which is an oxidation-reduction potential (ORP vs AgCl) of the mixed solution may be preferably 900 mV or more in terms of capable of effectively precipitating the iron ion in the mixed solution as a solid. That is, if the ORP value of the mixed solution is less than 900 mV, the iron ion concentration in the mixed solution may not be sufficiently lowered.

When precipitating iron, it is advantageous that manganese dioxide is separately added to the mixed solution in terms of promoting the reaction. Manganese dioxide added to the mixed solution becomes a crystal nucleus in the precipitation reaction in which the manganese ion in the mixed solution is converted to manganese dioxide, and promotes the precipitation reaction, so that the reaction in which the manganese ion is converted to manganese dioxide and precipitation of iron in association with the reaction can be generated in a short period of time.

As manganese dioxide to be added to the mixed solution, manganese dioxide obtained as a leached residue when leaching the lithium ion battery cathode material containing manganese may be suitably used.

With the iron precipitation reaction as described above, the lithium ion battery cathode material contained in the mixed solution can be leached. When leaching the lithium ion battery cathode material, hydrogen peroxide water may be preferably added to the mixed solution in terms of improving the leaching efficiency and shortening the leaching time.

After the leaching, a leached residue as a precipitate containing iron and manganese dioxide may be removed by solid-liquid separation or the like to obtain a leached solution.

(Recovery Step)

When dissolved valuable metals such as nickel and cobalt are present in the leached solution iron obtained by removing iron according to the method for removing iron from the iron-containing solution as described above and leaching other metals, a method of recovering the valuable metals can be carried out in order to recover the valuable metals from the leached solution.

In the recovering method, the leached solution obtained as described above may be subjected to, for example, a general solvent extraction method or an electrolytic method to recover each element including the target metals dissolved therein, as well as if manganese remains in a dissolved state in the leached solution, manganese is separated the target metals and recovered.

As a specific example, manganese is firstly recovered, among nickel, cobalt, and manganese dissolved in the leached solution, as shown in FIG. 1. However, in this case, the amount of manganese contained in the solution is decreased due to the precipitation of manganese dioxide during the leaching of the metal as described above. Alternatively, depending on the conditions, manganese may not be contained in the solution, and in this case, the recovery of manganese is not required. As a result, costs required for recovering manganese herein can be effectively reduced or eliminated.

Then, each of cobalt and nickel can be sequentially recovered, and each metal can be recovered.

According to such a recovering method, iron is not contained in the leached solution due to the iron removal as described above and it is thus unnecessary to perform solvent extraction for removing iron in the recovery step, so that the processing costs related to the solvent extraction can be reduced and the processing efficiency can be significantly improved.

Further, when the iron-containing solution also contains the cathode material-forming metal, the cathode material-forming metal in the iron-containing solution can also be recovered in the recovery step.

Example

The method of the present invention was experimentally conducted and its effects were confirmed as described below. However, the description herein is merely for the purpose of illustration and is not intended to be limited thereto.

Test Examples 1 to 7 were carried out by mixing the iron-containing solution containing the iron ion with the positive electrode-containing solution containing manganese, cobalt and nickel to generate the iron precipitation reaction, and leaching cobalt and nickel, measuring the iron ion concentration of the mixed solution thus obtained, and confirming whether or not the iron ion was precipitated as a solid.

A leaching rate, Fe concentration, pH and ORP after the reaction of each element in each of Test Examples 1 to 7 are shown in Table 1. In addition, the measurement of each concentration was carried out by ICP emission spectroscopic analysis, and the leaching rate was calculated therefrom. In Table 1, "When Leaching Rate is 100%" in the column of Fe concentration means the Fe concentration before the precipitation reaction.

TABLE 1

|  | Leaching Rate (%) After Reaction | | | | Fe Concentration (mg/L) | | | |
|---|---|---|---|---|---|---|---|---|
|  | Mn | Co | Ni | Fe | When Leaching Rate is 100% | After Reaction | pH | ORP (mV) |
| Test Example 1 | 4.9 | 94.8 | 95.3 | 0.0 | 420.3 | 0.0 | 1.00 | 1065 |
| Test Example 2 | 4.6 | 105.8 | 99.5 | 43.5 | 202.5 | 88.0 | 2.17 | 679 |
| Test Example 3 | 3.8 | 99.2 | 104.8 | 6.2 | 178.1 | 11.0 | 0.92 | 1055 |
| Test Example 4 | 11.9 | 105.5 | 105.3 | 3.0 | 178.7 | 5.4 | 1.28 | 1011 |
| Test Example 5 | 19.6 | 104.9 | 105.4 | 1.1 | 178.0 | 2.0 | 1.38 | 985 |
| Test Example 6 | 31.0 | 84.0 | 125.9 | 0.2 | 259.4 | 0.5 | 2.52 | 753 |
| Test Example 7 | 23.3 | 97.3 | 105.0 | 42.8 | 259.4 | 111.0 | 1.32 | 744 |

As can be seen from the results shown in Table 1, the leaching rate of Fe was low and the Fe concentration after the reaction was reduced as compared with the Fe concentration when the leaching rate was 100%, in all Test Examples 1 to 7. Therefore, these results show that in all Test Examples, iron was effectively reduced and precipitated.

Particularly in Test Examples 1, 3 to 5 in which the ORP value was 900 mV or more, the leaching rate of Fe was less than 10% which was a significantly low value. Therefore, it is understood that it is more advantageous to control the ORP value to 900 mV or less.

As can be seen from comparison of Test Example 6 with Test Example 7, even if the ORP value was less than 900 mV, Fe could be substantially precipitated by increasing the pH to about 2.5. In Test Example 6, the leaching rate of Co was lowered, so that this test example was not preferred so much in terms of the Co recovery rate.

In view of foregoing, it is understood that according to the method for removing iron from the iron-containing solution of the present invention, iron can be effectively removed from the iron-containing solution.

What is claimed is:

1. A method for removing iron from an iron-containing solution containing an iron ion, comprising:
adding a lithium ion battery cathode material containing manganese to an acidic sulfuric acid solution to obtain a cathode material-containing solution, and then precipitating a manganese ion as manganese dioxide in a mixed solution obtained by mixing the iron-containing solution with the cathode material-containing solution while precipitating the iron ion contained in the iron-containing solution as a solid.

2. The method for removing iron from the iron-containing solution according to claim 1, wherein an iron ion concentration in the iron-containing solution is from 50 mg/L to 1 g/L.

3. The method for removing iron from the iron-containing solution according to claim 1, wherein a pH of the mixed solution obtained by mixing the iron-containing solution with the cathode material-containing solution is from 1 to 2.

4. The method for removing iron from the iron-containing solution according to claim 1, wherein an oxidation-reduction potential value of the mixed solution obtained by mixing the iron-containing solution with the cathode material-containing solution is 900 mV or more.

5. The method for removing iron from the iron-containing solution according to claim 1, wherein hydrogen peroxide water is added when the lithium ion battery cathode material containing manganese is leached.

6. The method for removing iron from the iron-containing solution according to claim 1, wherein manganese dioxide is added to the mixed solution obtained by mixing the iron-containing solution with the cathode material-containing solution.

7. The method for removing iron from the iron-containing solution according to claim 6, wherein manganese dioxide added to the mixed solution is manganese dioxide contained in a leached residue of a lithium ion battery cathode material containing manganese.

8. The method for removing iron from the iron-containing solution according to claim 1, wherein the lithium ion battery cathode material further comprises, in addition to manganese, at least one cathode material-forming metal making up the lithium ion battery cathode material, and wherein the iron-containing solution further comprises the cathode material-forming metal before mixed with the cathode material-containing solution.

9. The method for removing iron from the iron-containing solution according to claim 8, wherein the at least one cathode material-forming metal is cobalt and/or nickel.

10. A method for recovering at least one valuable metal from at least one cathode material-forming metal contained in a lithium ion battery cathode material and an iron-containing solution by using the method for removing iron from the iron-containing solution according to claim 8, comprising:

carrying out the method for removing iron from the iron-containing solution, and then recovering the at least one valuable metal in the iron-containing solution as well as the at least one valuable metal in the lithium ion battery cathode material.

\* \* \* \* \*